United States Patent [19]
Suzuki et al.

[11] Patent Number: 5,168,841
[45] Date of Patent: Dec. 8, 1992

[54] TAPPET WITH CERAMIC SEAT PLATE

[75] Inventors: Osamu Suzuki; Masato Taniguchi; Masaya Ito, all of Aichi, Japan

[73] Assignee: NGK Spark Plug Co., Ltd., Nagoya, Japan

[21] Appl. No.: 732,203

[22] Filed: Jul. 19, 1991

[30] Foreign Application Priority Data

Jul. 20, 1990 [JP] Japan .................................. 2-193397
Jun. 18, 1991 [JP] Japan .................................. 3-173157

[51] Int. Cl.$^5$ .............................................. F01L 1/14
[52] U.S. Cl. ............................. 123/90.48; 123/90.51; 29/888.43; 74/569
[58] Field of Search .................... 123/90.48, 90.51; 74/569; 29/888.43

[56] References Cited

U.S. PATENT DOCUMENTS

| | | | |
|---|---|---|---|
| 3,683,876 | 8/1972 | Lesher | 123/90.51 |
| 4,317,433 | 3/1982 | Fuhrmann | 123/90.51 |
| 4,366,785 | 1/1983 | Goloff et al. | 123/90.51 |
| 4,508,067 | 4/1985 | Fuhrmann | 123/90.51 |
| 4,768,476 | 9/1988 | Behnke et al. | 29/888.43 |
| 4,909,198 | 3/1990 | Shiraya et al. | 123/90.51 |
| 5,060,607 | 10/1991 | Taniguchi | 123/90.51 |

FOREIGN PATENT DOCUMENTS 176409 10/1983 Japan ............................... 123/90.51

Primary Examiner—E. Rollins Cross
Assistant Examiner—Weilun Lo
Attorney, Agent, or Firm—Foley & Lardner

[57] ABSTRACT

A tappet for an internal combustion engine comprises a tappet main body and a ceramic seat plate. The tappet main body is constituted by axially separated first and second parts which are made of different metallic materials. The first part is for installation in a hole of a cylinder block for sliding therein. The second part is for installation between a push rod and a cam. The metallic material for the second part is more wear-resistant than that of the first part. The ceramic seat plate is brazed to the second part, and the first and second parts are joined together by welding such as electron beam welding, laser beam welding, etc.

11 Claims, 5 Drawing Sheets

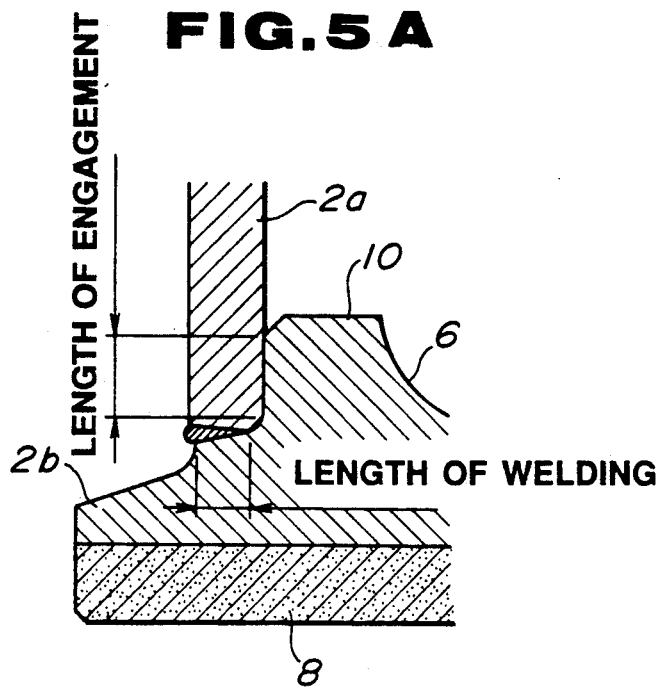
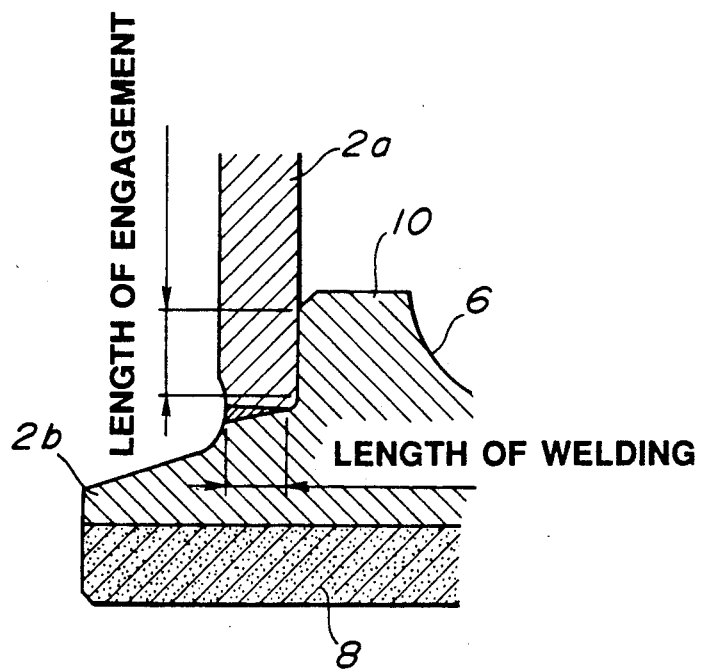

TAPPET WITH CERAMIC SEAT PLATE

BACKGROUND OF THE INVENTION

1. Field of the Invention

The present invention relates to a tappet for an internal combustion engine, particularly of the kind having a ceramic seat plate for contact with a cam.

2. Description of the Prior Art

A prior art tappet for an internal combustion engine has usually been made of a single metallic material such as chilled cast iron or hardened steel in its entirety.

Recently, in order to meet the demand for a higher output of an engine through improvement of the wear resistance of the tappet, it has been proposed to provide a tappet consisting of a tappet main body made of a single metallic material and a ceramic disk or seat plate brazed to an end of the tappet main body.

The prior art tappet having the ceramic seat plate is encountered by the following problems.

(a) If the tappet main body is made of such a metallic material that deteriorates in mechanical properties due to the heat during brazing, heat treatment of the tappet after brazing is necessitated. However, such heat treatment may lower the strength of the brazed portion. Accordingly, the tappet is desired to be made of such a metallic material that becomes hardened by the heat during brazing. A satisfactory metallic material for this end is considered to be SNCM 630 (nickel-chromium-molybdenum steel according to Japanese Industrial standards), SKC 24 (hollow drill steel according to Japanese Industrial Standards), etc. However, these metallic materials are expensive. Accordingly, when such metallic materials are used for the tappet main body, a high manufacturing cost of the tappet will inevitably result.

(b) A metallic material suitable for being joined with the ceramic seat plate is generally poor in machinability, resulting in a high manufacturing cost. This is particularly true when the tappet needs to be machined for forming a deep hole.

SUMMARY OF THE INVENTION

In accordance with the present invention, there is provided a novel and improved tappet which comprises a tappet main body consisting of two axially separated parts which are made of different metallic materials and joined together by welding, and a ceramic seat plate joined to an axial end of one of the parts.

This structure is effective for overcoming the foregoing problems inherent in the prior art tappet.

It is accordingly an object of the present invention to provide a novel and improved tappet which can reduce the manufacturing cost through reduction of the material and machining expenses.

It is a further object of the present invention to provide a novel and improved tappet of the above described characte which can increase the production efficiency for thereby further reducing the manufacturing cost.

It is a further object of the present invention to provide a novel and improved tappet of the above described character which can attain a sufficient strength of a joining portion while attaining a light weight.

BRIEF DESCRIPTION OF THE DRAWING

FIGS. 5A and 5B are enlarged fragmentary sectional views for illustration of a length of engagement and a length of welding in the tappet of FIG. 4.

DETAILED DESCRIPTION OF THE PREFERRED EMBODIMENTS

Figure 1:
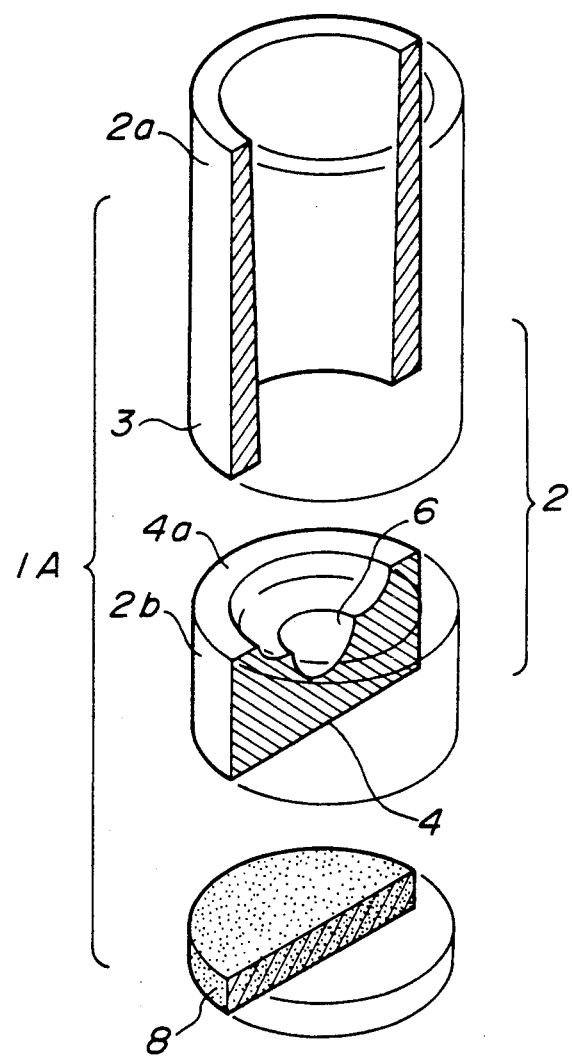
FIG. 1 is an exploded, sectional view of a tappet according to an embodiment of the present invention.
Figure 2:
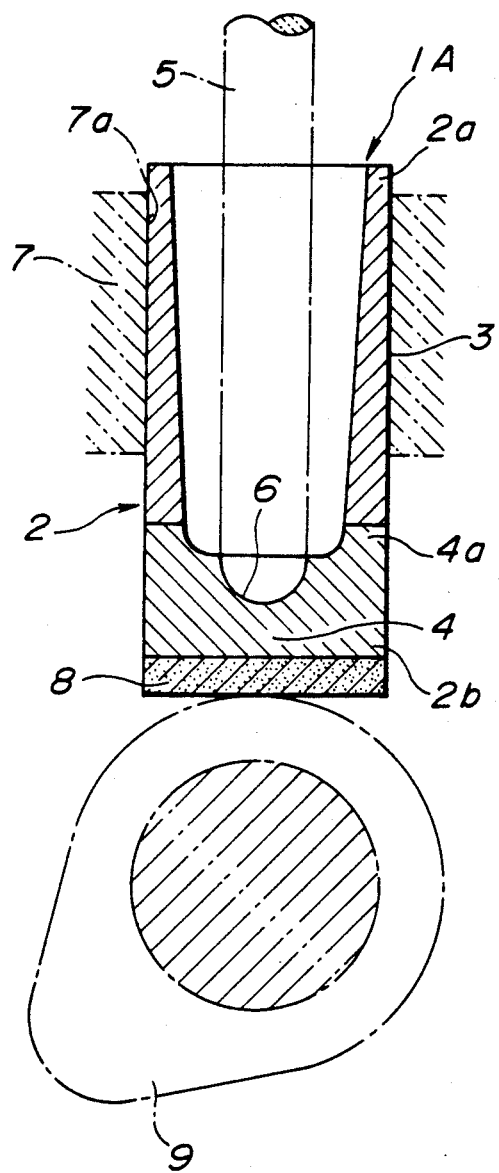
FIG. 2 is a sectional view of the tappet of FIG. 1 in an assembled state.

Referring to FIGS. 1 and 2, a tappet 1A is shown as including a tappet main body 2 of a hollow bottomed shape and having a hollow cylindrical guide 3 and a bottom wall 4 at an end of the guide 3. The bottom wall 4 has at a central portion of an inner side surface a semispherically recessed portion 6 for bearing a lower end of a push rod 5 constituting part of a valve operating mechanism.

The tappet main body 2 is separated into a tubular upper part 2a and a lower part 2b at least including the the bottom element 4. The upper part 2a and lower part 2b are joined together by brazing to constitute the tappet main body 2.

The upper part 2a is made of S40C (carbon steel for machine structural use according to Japanese Industrial Standards) which is inexpensive and has a good machinability. Since in operation the upper part 2a only slides up and down in a guide hole 7a of a cylinder block 7, it does not need to have a high wear resistance. However, when the upper part 2a cannot have a sufficient wear resistance by the hardness of its own material, its outer surface may be processed by hardening prior to joining with the lower part 2b. In this connection, if the hardening of the upper part 2a is to be performed after the joining of the upper and lower parts 2a and 2b, a restriction such as a necessity of using induction hardening will arise. Thus, it is desirable to perform the hardening of the upper part 2a before the joining of the upper and lower parts 2a and 2b.

The lower part 2b is so shaped as to have the bottom wall 4 and a circumferential wall 4a on the upper side of the bottom wall 4 and be continuous with the lower end of the upper part 2a. Since the push rod 5 and the recessed portion 6 slide upon each other while applying a large load against each other, the lower part 2b is desired to be formed from SNCM 630 (nickel-chromium-molybdenum steel according to Japanese Industrial Standards) or SKC 24 (hollow drill steel according to Japanese Industrial standards) which has an excellent wear resistance.

Further, as occasion demands, the lower part 2b may in its entirety or at least at the recessed portion 6 be processed by electron beam hardening or laser beam hardening to increase its wear resistance.

The upper part 2a and lower part 2b are joined together by welding such as electron beam welding or laser beam welding. Thereafter, it is desirable to perform cutting of a bead and adjustment of the perpendicularity of the upper part 2a, and adjustment of the flatness of the bottom outer side surface of the lower part 2b.

The outer side surface of the bottom wall 4 of the tappet main body 2 is joined with a ceramic seat plate 8.

The ceramic seat plate 8 is prepared by machining a circular silicon nitride plate sintered at atmospheric pressure and containing 90 wt % of $Si_3N_4$. The ceramic seat plate 8 may be metalized at the joining surface for joining with the lower part 2b.

The tappet 1A is produced as follows.

Firstly, the ceramic seat plate 8 is brazed to the lower part 2b. This brazing is performed under heating and by using an Ag-Cu brazing metal containing Ti. A desired brazing metal is an Ag-Cu-Ti alloy, Ag-Cu-In-Ti alloy, Ag-Ti alloy, Cu-Ti alloy or Ag-Cu-Ni-Ti alloy. In the case where the ceramic seat plate 8 is processed by metalizing as described above, an Ag-Cu alloy or Ag-Cu-In alloy is desirable.

A brazing atmosphere is desired to be a nonoxide atmosphere such as an atmosphere of vacuum, Ar, $H_2$ or $N_2$. Particularly, in the case where the brazing metal containing Ti is used, an atmosphere of vacuum or Ar is desired.

The brazing temperature is set to be higher than the transformation temperature Ar of the metal forming the lower part 2b so that the lower part 2b is hardened by the heating for brazing.

In the meantime, SNCM 630 (nickel-chromium-molybdenum steel according to Japanese Industrial Standards) forming the lower part 2b is of such a metallic material that is hardened by the heating for brazing and therefore is considered to be able to attain a sufficient hardness after the heating for brazing. However, in the case where the hardness of the lower part 2b is still insufficient after the heating for brazing, this insufficiency can be compensated for when at least the recessed portion 6 for contact with the push rod 5 is treated by electron beam hardening or laser beam hardening to increase the wear resistance.

Further, a thin plate made of metal such as Ni, Cu or Fe is interposed between the lower part 2b and the ceramic seat plate 8 to serve as a buffer member for weakening the influence of stresses between them.

Then, the upper part 2a and lower part 2b are joined together. This joining is attained by electron beam welding or laser beam welding. In order to remove cutting oil or the like stain from the upper and lower parts 2a and 2b before welding, it is desired to clean their joining surfaces. If any deformation or distortion is caused at the welded portion, tempering in the range from 100° C. to 200° C. is made as the occasion demands. Further, the bead remaining in the welded portion is removed by machining as the occasion demands. Three test products 1 to 3 of this embodiment are produced under the following conditions and subjected to the durability test of continuous 1000 hours by installing the test products on 4-liter OHV diesel engine and operating the engine under a fully loaded condition and at 4000 rpm. The test result is shown in Table 1.

TABLE 1

| Test product No. | Amount of Wear (μm) | | Surface Hardness at Recessed Portion (6) (Hv) |
|---|---|---|---|
| | Ceramic Seat Plate (8) | Recessed Portion (6) | |
| 1 | <1 | 4 | 380 |
| 2 | <1 | 5 | 382 |

TABLE 1-continued

| Test product No. | Amount of Wear (μm) | | Surface Hardness at Recessed Portion (6) (Hv) |
|---|---|---|---|
| | Ceramic Seat Plate (8) | Recessed Portion (6) | |
| 3 | <1 | 2 | 475 |

TEST PRODUCT 1

Figure 3:
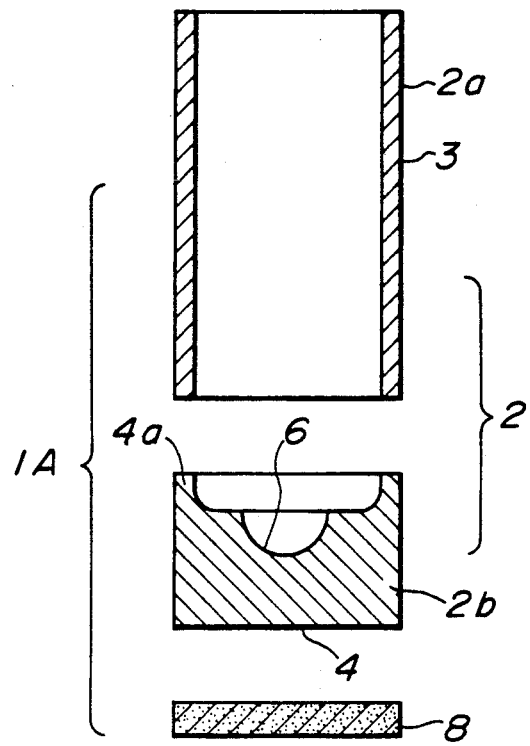
FIG. 3 is a sectional view of the tappet of FIG. 1 in a disassembled state.

An exploded cross sectional view of a test product 1 is shown in FIG. 3.

The lower part 2b is formed from a material of SNCM 630 which is spheroidized by annealing and cold forged into the size of 30 mm of diameter and 200 mm of length. The surfaces of the lower part 2b for contact with the upper part 2a and the ceramic seat plate 8 are machined to a predetermined flatness.

The ceramic seat plate 8 is formed from a silicon nitride material which is sintered at atmospheric pressure and contains 90 wt % of $Si_3N_4$ and shaped by grinding into the size of 30 mm of diameter and 3 mm of thickness.

The ceramic seat plate 8 and lower part 2b are brazed together in a vacuum and at 790° C. by using an active brazing metal of Ag-Cu-In-Ti alloy and cooled to 300° C. in 15 min. after treated by a substitution process in a $N_2$ gas.

The upper part 2a is formed from a steel pipe of S40C (carbon steel according to Japanese Industrial standards) of 30 mm of outer diameter and 25 mm of inner diameter and cut to be 50 mm of length and processed by hardening and annealing so as to be hard Rockwell C 35.

The upper part 2a and lower part 2b are joined by electron beam welding and held at 100° C. for an hour for removal of stresses. After that, cutting of a bead and machining for adjustment of the perpendicularity of the upper part 2a are performed as the occasion demands. The depth of fusion at the welded portion is 2.2 mm.

TEST PRODUCT 2

This test product is similar to the test product 1 except for the method of brazing together the lower part 2b and ceramic seat plate 8, that is, the ceramic seat plate 8 is first metalized at a joining surface by vapor deposition and then brazed to the lower part 2b at 790° C. and by using a brazing metal of Ag-Cu-In alloy and cooled to 300° C. in 15 min. after treated by a substitution process in an $N_2$ gas.

TEST PRODUCT 3

In addition to the processes for production of the test product 1, the surface of the recessed portion 6 of the lower part 2b for contact with the push rod 5 is processed by electron beam hardening and thereby given an increased surface hardness. The depth of fusion at the welded portion is 2.2 mm.

Figure 4:
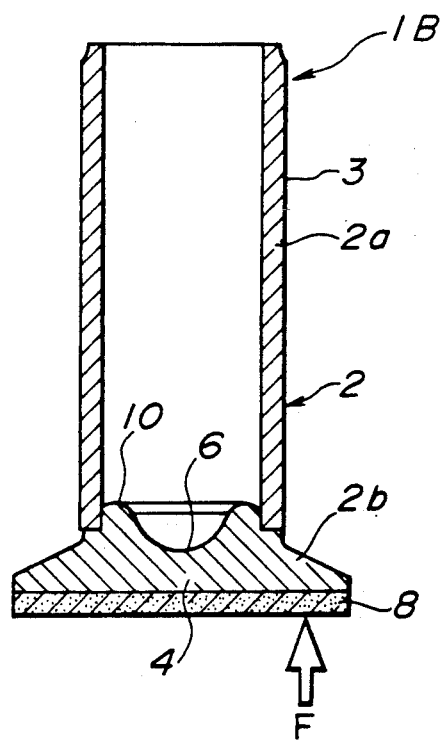
FIG. 4 is a sectional view of a tappet according to another embodiment of the present invention.

Another embodiment of a tappet 1B is shown in FIG. 4.

The tappet 1B is a so-called mushroom type and larger in outer diameter at the lower part 2b than at the upper part 2a.

In case of such a mushroom type tappet 1B, when the cam 9 comes to contact a peripheral portion of the tappet 2 while applying a push-up force F thereto as shown in FIG. 4, a bending tension stress is caused in a part of the joined portion (welded portion) between the upper and lower parts 2a and 2b, which part is located on the side of the upper part 2a diametrically opposed to the side adjacent to the acting point. In this instance, in the case of the joined portion being a simple butt-joint as shown in FIG. 1, the joined portion may lack strength and has a possibility of being broken due to fatigue. One way of preventing this may be to increase the thickness of the upper part and thereby increase the length of welding, thereby increasing the strength of the joined portion. However, this is disadvantageous since the overall weight of the tappet is increased, thus causing an adverse effect to the purpose of attaining a light weight of an engine.

Thus, the tappet 1B is structured so as to be able to increase the strength of the joined portion without increasing the thickness of the upper part 2a, that is, the upper surface of the lower part 2b is formed with a protruded portion 10 and firmly fitted thereat with the upper part 2a by interference fit, and then the butt-joint portion between them is joined by welding, etc.

Hereinafter, the tappet 1B will be described more in detail.

The upper part 2a is formed from a metallic pipe of STKM 16 C (carbon steel pipe for machine structural use according to Japanese Industrial Standards) and of the size of 18 mm of inner diameter and 22 mm of outer diameter. The metallic pipe is cut to be 50 mm of length and hardened to be Rockwell C 40.

In this connection, as described with respect to the previous embodiment of FIGS. 1 to 3, it is desired to perform a heat treatment for hardening the upper part 2a before the upper part 2a is joined with the lower part 2b. In the case of the tappet 1B, the upper part 2a and lower part 2b are fitted by interference fit and then joined together by welding. Due to this, the upper part 2a, if processed by hardening after the joining of the both parts 2a and 2b, is caused to expand due to martensite transformation, thus causing the amount of interference to be undesiredly reduced and possibly to zero.

The lower part 2b is formed from a metallic material of SNCM 630 (nickel-chromium-molybdenum steel according to Japanese Industrial Standards) and machined into a nearly truncated cone of a maximum diameter of 35 mm and 7 mm of height and having at the upper surface an annular protruded portion 10.

The outer diameter of the protruded portion 10 is sized to be a little larger than the inner diameter of the upper part 2a so that the protruded portion 10 and the lower end of the upper part 2a are fitted together by interference fit. The difference between the outer diameter of the protruded portion 10 and the inner diameter of the lower end of the upper part 2a will hereinafter be referred to as "interference". Further, as shown in FIGS. 5A and 5B, an actual length of engagement of the upper part 2a and lower part 2b, which does not contain length of engagement of chamferred or rounded portions thereof, is hereinafter referred to as "length of engagement", and a minimum length of welding at the welded portion is hereinafter referred to as "length of welding".

The ceramic seat plate 8 is formed from a powdered material containing 90 wt % of $Si_3N_4$, sintering aides of $Al_2O_3$ and $Y_2O_3$ and binders, into a circular plate by means of a pressing die and sintered at ordinary pressure in atmosphere of $N_2$ and grounded at the flat portion to be finished to the size of 35 mm in diameter and 3 mm of thickness.

Then, the production of the tappet 1B will be described hereinafter.

Firstly, the lower part 2b is joined with the ceramic seat plate 8 by brazing. This brazing is performed by interposing a brazing metal of In-Cu-Ag-Ti alloy between the lower part 2b and the ceramic plate 8, holding them in a vacuum at 795° C. for 30 min. and thereafter cooling them in a furnace. In the meantime, by the heating for brazing, the lower part 2b is hardened to be Rockwell C 40.

Then, the upper part 2a and the lower part 2b is press-fitted on the protruded portion 10 of the lower part 2b for thereby allowing the upper part 2a and lower part 2b to be fitted by interference fit. In this connection, in plate of the interference fit, another fitting such as shrinkage fit, etc. can be used.

Then, the butt-joint portion between the upper part 2a and the lower part 2b is processed by electron beam welding.

The depth of fusion at the joint portion of any product is 2.2 mm.

Five test products 1 to 5 of the tappet 1B structured as above and differing in interference and length of engagement were produced and subjected to a durability test by being installed on a 15-liter 8-cylinder diesel engine and setting the valve clearance to be three times of a standard value (about 0.3 to 0.4 mm) while operating the engine at 150% of rated speed (about 2,500 r.p.m.). The test result is shown in Table 2.

TABLE 2

| Test Product No. | Interference (μm) | Length of Engagement (mm) | Length of Engagement Length of Welding | Result |
| --- | --- | --- | --- | --- |
| 1 | 10 | 1 | 0.5 | Broken at welded portion after 200 hour. |
| 2 | 12 | 2 | 2 | No damage was caused after 400 hour. |
| 3 | 16 | 3 | 1 | No damage was caused after 400 hour. |
| 4 | 30 | 2 | 1 | No damage was caused after 400 hour. |
| 5 | −100 (loose fit) | 2 | 0.9 | Broken at welded portion after 15 hour. |

From this test result, it will be known that a better effect is obtained under the condition of (length of engagement/length of welding) ≧ 1.

Figure 6:
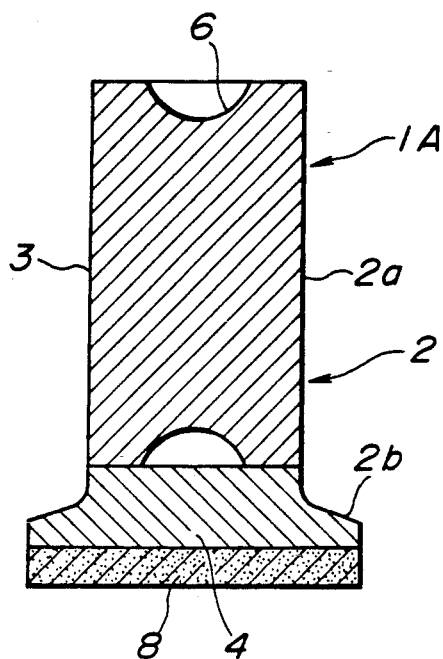
FIGS. 6 and 7 are sectional views of tappets according to further embodiments of the present invention.
Figure 7:
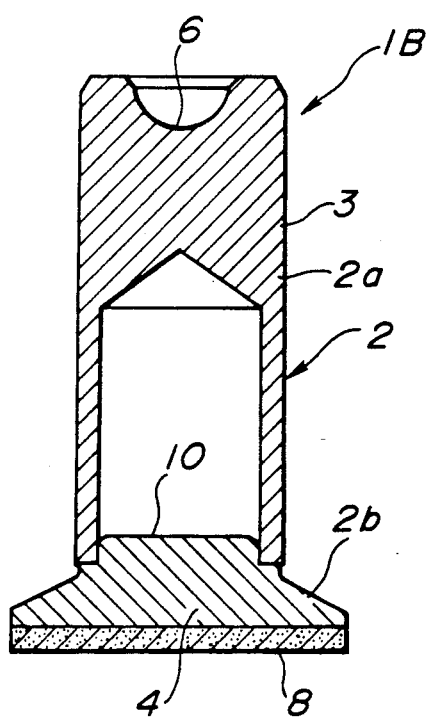

While the present invention has been described and shown as above, it is not limitative. For example, while the upper part 2a has been described and shown as being hollow cylindrical, it can otherwise be generally or partly solid as shown in FIGS. 6 and 7. In this instance, the upper part 2a is machined into a desired shape, for example formed at the upper end surface with the recessed portion 6 for bearing the push rod 6, then hardened and joined with the lower part 2b.

A further embodiment is substantially similar to the previous embodiment of FIGS. 1 to 3 except that the upper part 2a and lower part 2b are joined by friction welding. However, since the friction welding causes a considerable heat which is transferred to the joined portion between the lower part 2b and the ceramic seat plate 8, differing from the embodiment of FIGS. 1 to 3, the upper part 2a and the lower part 2b are first joined by friction welding, and then the lower part 2b and the ceramic plate 8 are joined by brazing.

This embodiment was tested for the breakage strength of the joined portion by holding the upper part 2a at its outer circumferential surface and applying a load thereto perpendicularly to the outer circumferential surface, and it was found that the breakage strength was 4,400 kgf. On the other hand, two best products of the embodiment of FIGS. 1 to 3 which differ in the depth of fusion were prepared and tested for the breakage strength, and it was found that the breakage strength of the test product which was 2.2 mm of the depth of fusion was 4,300 kgf and the breakage strength of the lest product which was 1.0 mm of the depth of fusion was 2,000 kgf.

The 400-hour durability test of the above described three kinds of tappets was made by installing the tappots on a 15-liter 8-cylinder diesel engine which was set to have a valve clearance which was three times of a standard value and operated at 4,500 rpm which was 1.8 times of a rated speed. By this test it was found that the tappet having the welded upper and lower parts and of 1.0 mm of the depth of fusion was broken at the welded portion after 100 hours and other tappets were not broken.

From the foregoing, it will be understood that since a tappet is constituted by separate upper and lower parts which are joined together, the lower part can be formed from a metallic material which, though expensive, is suited for being joined with the ceramic plate, and the upper part which requires to be less wear-resistant as compared with the upper part can be formed from a cheap metallic material, that is, the metallic materials for the upper and lower parts can be choosed depending upon the requirement, thus making it possible to reduce the cost of the material considerably.

It will be further understood that by separating a tappet into upper and lower parts a tubular portion of a lower part, in case of producing a tappet which requires machining of a deep hole, can be shallow and therefore the lower part, even though from SNCM 630 or SKC 24 which is poor in machinability, can be machined relatively with ease.

It will be further understood that since the upper part can be simple in shape, e.g., tubular, it can be machined with ease from a carbon steel pipe for ordinary piping, thus making it possible to reduce the manufacturing cost.

It will be further understood that in case of the upper and lower parts being joined together by welding only the part needs to be processed by heat treatment when being joined with the ceramic plate by brazing, thus making it possible to increase the number of products which can be treated in a furnace at one time and therefor making it possible to reduce the manufacturing cost.

It will be further understood that by firmly fitting together the protruded portion of the lower part and the upper part by interference fit and joining the butt-joint portion by welding, etc. the joined portion or welded portion, even when subjected to a bending tensile strength, the joint strength by the effect of the interference fit of the upper and lower parts acts in the direction opposing to the bending tensile strength, thus making it possible to increase the strength of the joined portion. Accordingly, it becomes possible to reduce the thickness of the upper part and therefore the weight of the tappet while attaining a sufficient joining strength by suitably setting the ratio of length of engagement to the length of welding.

It will be further understood that when the hardness of the lower part surface portion for contact with the push rod is insufficient the wear resistance of the surface can be increased to a desired level by processing the surface by an electron beam hardening or laser beam hardening. In this instance, by separating the tappet into two parts, i.e., upper and lower parts the lower part can be hardened prior to being joined with the upper part, thus making it possible to harden with ease the portions which are to be surrounded by the upper part later, such as a bottom inside wall of the lower part, etc.

It will be further understood that the present invention makes it possible to provide a tappet which is light in weight, cheap in cost and excellent in wear resistance and reliability.

What is claimed is:

1. A method of forming a tappet for use between a push rod and a cam in an internal combustion engine, comprising the steps of:

forming a first part of a tappet main body from a metallic material, which first part is installed in a hole of a cylinder block of said engine for sliding therein;

forming a second part of a tappet main body from a metallic material which is more wear-resistant than that of said first part, which second part is installed between said push rod and said cam;

preparing a ceramic seat plate for contact with said cam;

assembling said second part having said ceramic seat plate with said first part to provde a butt-joining portion therebetween and joining said butt-joint portion by friction welding; and brazing said ceramic seat plate to said second part.

2. A tappet comprising:

a tappet main body including two axially separated parts which are made of different metallic materials and which are joined together by welding; and a ceramic seat plate joined to an axial end of one of said parts;

said one part of said tappet main body having opposed side surfaces and being joined at one of said side surfaces to said ceramic seat plate, said one part having at the other of said side surfaces a protruded portion and being tightly fitted at said protruded portion with the other of said parts while providing a butt-joint portion between said parts, at which butt-joint portion said parts are joined together by said welding.

3. A tappet according to claim 2, wherein said other part has a surface for contact with a push rod of an engine, said surface of said other part being hardened by heat treatment.

4. A tappet according to claim 3, wherein said parts are joined together by friction welding.

5. A tappet according to claim 4, wherein said one part is made of a metallic material which is more wear-resistant than said other part.

6. A tappet for use between a push rod and a cam in an internal combustion engine, comprising:

a tappet main body consisting of axially separated first and second parts which are made of different metallic materials and joined together by welding;

said first part being installed in a hole of a cylinder block of said engine for sliding therein;

said second part being installed between said push rod and said cam and having an inner side surface for contact with said push rod and an outer side surface; and a ceramic seat plate brazed to said outer side surface of said second part and having a side surface for contact with said cam.

7. A method of forming a tappet for use between a push rod and a cam in an internal combustion engine, comprising the steps of:

forming a first part of a tappet main body from a metallic material, which first part is installed in a hole of a cylinder block of said engine for sliding therein;

forming a second part of a tappet main body from a metallic material which is more wear-resistant than that of said first part, which second part is installed between said push rod and said cam;

preparing a ceramic seat plate for contact with said cam;

brazing said ceramic seat plate to said second part; and assembling said second part having said ceramic seat plate with said first part to provide a butt-joint portion therebetween and joining said butt-joint portion by welding.

8. A method of forming a tappet according to claim 7, further comprising the step of hardening at least a portion of said second part for contact with said push rod after the step of said brazing.

9. A method of forming a tappet according to claim 8, further comprising the step of hardening said first part before the step of said assembling and joining.

10. A method of forming a tappet according to claim 9, further comprising the step of forming a protruded portion of said second part for interference fit with said first part before the step of said assembling and joining.

11. A method of forming a tappet according to claim 9, further comprising the step of forming a protruded portion of said second part for shrinkage fit with said first part before the step of assembling and joining.

* * * * *